(12) United States Patent
Bellinger et al.

(10) Patent No.: US 7,310,663 B2
(45) Date of Patent: *Dec. 18, 2007

(54) INITIATION MODULE FOR INITIATING NETWORK-BASED SERVICES

(75) Inventors: Douglas Bellinger, Ottawa (CA); Richard Burke, Vanier (CA); Thomas Phillips, Ottawa (CA); Antonino Scaffidi Argentina, Gloucester (CA); Geoff Stewart, Ottawa (CA); Wendy Raoux, Ottawa (CA); Patrick Rhude, Dunrobin (CA)

(73) Assignee: Atreus Systems Corp., Ottawa (CA)

( * ) Notice: Subject to any disclaimer, the term of this patent is extended or adjusted under 35 U.S.C. 154(b) by 778 days.

This patent is subject to a terminal disclaimer.

(21) Appl. No.: 10/384,268

(22) Filed: Mar. 7, 2003

(65) Prior Publication Data

US 2003/0191826 A1    Oct. 9, 2003

(51) Int. Cl.
*G06F 15/177* (2006.01)
*G06F 15/16* (2006.01)

(52) U.S. Cl. .................. 709/220; 709/228
(58) Field of Classification Search ............ None
See application file for complete search history.

(56) References Cited

FOREIGN PATENT DOCUMENTS

WO    PCT/IB02/01629    5/2001

OTHER PUBLICATIONS

U.S. Appl. No. 09/852,708, filed May 11, 2001, Bellinger et al.
U.S. Appl. No. 60/354,268, filed Feb. 4, 2002, Bellinger et al.
U.S. Appl. No. 10/213,043, filed Aug. 5, 2002, Bellinger et al.
U.S. Appl. No. 10/223,846, filed Aug. 19, 2002, Bellinger et al.
U.S. Appl. No. 10/357,852, filed Feb. 3, 2003, Bellinger et al.
"Writing Apache Modules With Perl And C," by Lincoln Stein and Doug MacEachern, Mar. 1999, 701 pages. (ISBN: 1-56592-567-X).

*Primary Examiner*—Zarni Maung
*Assistant Examiner*—Alan S Chou
(74) *Attorney, Agent, or Firm*—Imperium Patent Works; Darien K. Wallace; T. Lester Wallace

(57) ABSTRACT

A system allows subscribers quickly to self-activate network-based services by automatically configuring network elements. A service provider preconfigures a state machine on a core server. At the time of self-activation, activations are sent to policy distribution points (PDPs) that translate the activations into device-specific instructions, which in turn configure network elements to provide services. The speed of self-activation is increased by generating activations faster in the core server, by translating activations into device-specific instructions faster in the PDPs, and by separating the configuration of the network elements from complex registration steps. Initiation steps that configure network elements are performed faster by an initiation module that reads from, but does not write to, databases. Subscribers perform dynamic service selection using the initiation module. Initiating services faster results in a more enjoyable user experience as subscribers quickly switch back and forth between network-based services.

24 Claims, 8 Drawing Sheets

STEPS TO INITIATE A SERVICE

STEPS TO INITIATE A SERVICE

FIG. 6

FIG. 7

INITIATION MODULE FOR INITIATING NETWORK-BASED SERVICES

CROSS REFERENCE TO RELATED APPLICATION

This application claims the benefit under 35 U.S.C. §120 of patent application Ser. No. 10/213,043, entitled "System And Method For Setting Up User Self-Activating Network-Based Services", by Bellinger et al., now U.S. Pat. No. 7,024,470 (the subject matter of which is incorporated herein by reference), which in turn claims the benefit under 35 U.S.C. §119 of the provisional application Ser. No. 60/354,268, entitled "Software Platform For Managing Network-Based Services", by Bellinger et al., filed Feb. 4, 2002 (the subject matter of which is incorporated herein by reference).

TECHNICAL FIELD

The present invention relates to setting up network-based services, and more particularly to a method by which a subscriber quickly self-activates network-based services.

CROSS REFERENCE TO COMPACT DISC APPENDIX

Compact Disc Appendix, which is a part of the present disclosure, includes one recordable Compact Disc (CD-R) containing information that is part of the disclosure of the present patent document. A portion of the disclosure of this patent document contains material that is subject to copyright protection. All the material on the Compact Disc is hereby expressly incorporated by reference into the present application. The copyright owner of that material has no objection to the facsimile reproduction by anyone of the patent document or the patent disclosure, as it appears in the Patent and Trademark Office patent files or records, but otherwise reserves all copyright rights.

BACKGROUND

Providing a network-based service generally involves provisioning both hardware and software. An example of such a network-based service is offering different levels of access to the Internet (referred to as "Quality of Service (QoS)") through a service provider's network.

When a subscriber wishes to subscribe to the service, typically a person at the service provider manually configures the hardware and software components of the necessary network elements to allow the subscriber to consume the service. Such configuration might, for example, involve setting up configuration files on a QoS server and configuring a gateway and a firewall to allow information from the subscriber to pass through the service provider's network and reach the Internet. This can be a time-consuming task.

A product is provided that facilitates and automates this configuration process. A service provider can use this product to publish an offering of various networked-based services to subscribers. The subscriber can choose to subscribe to the service. Once the subscriber has agreed to subscribe, the product is used to register the subscriber for the service so that the necessary configuration operations can be performed on the network elements automatically. An example of such a product is the xAuthority software system available from Atreus Systems Corp., of Ottawa, Ontario.

Typically service provider personnel use the xAuthority system to publish a service offering to a subscriber. When the subscriber expresses interest in a particular service, service provider personnel use the xAuthority system to subscribe the subscriber to the service. Once subscription has taken place, the subscriber registers for the service. Thereafter, the service is initiated. The subscriber registers by accessing a service portal of the xAuthority system and provides inputs to a preconfigured state machine. After the subscriber is registered, the state machine initiates the service by provisioning network elements to provide the service to the subscriber.

The registration process contains many steps and can be quite complex. Delays occur during this process, which involves many events. Initiating a service is slowed when numerous complex registration steps are repeated prior to each time a subscriber intermittently uses a service. Impatient subscribers wait while all of the registration steps are repeated when those subscribers wish to return to the service. An impatient subscriber may therefore be dissuaded from using the services. A solution is desired.

SUMMARY

A system allows a subscriber quickly to self-activate network-based services by automatically configuring network elements. A service provider preconfigures a state machine on a core server. The state machine is run through publication steps, subscription steps, registration steps and initiation steps, and the subscriber self-activates the services using the state machine.

During the initiation steps, activations are sent to policy distribution points (PDPs) that translate the activations into device-specific instructions, which in turn configure network elements to provide the services. The speed of self-activation is increased by generating activations faster in the core server, by translating activations into device-specific instructions faster in the PDPs, and/or by configuring network elements faster through performing registration operations before the initiation steps.

Activations are generated in the core server and are translated in the PDPs by modules of web server software that are compiled together with the rest of the web server software on the core server and PDPs. The modules operate faster because they are compiled together with the web server software. Writing configuration files and other registration information to databases is performed during the registration steps. The initiation steps are performed by an initiation module. The initiation steps are performed faster because they are focused on configuring network elements and do not involve writing to databases. When the subscriber intermittently uses a service, for example, by switching back and forth between services, the initiation module efficiently and automatically performs the initiation steps each time the subscriber begins and ends the service. The initiation module performs dynamic service selection by dynamically generating activations used to start and stop services.

In one embodiment, an interface is provided whereby the service provider identifies a network element used to provide a service to the subscriber. The service provider defines configuration information that is sent to the network element in the event the subscriber elects to start the service. Thereafter, a second interface is provided whereby the subscriber registers for the service and initiates the service without action by the service provider. The subscriber registers once for the service and thereafter is able to initiate the service multiple times, starting and stopping the service at will.

Starting the service involves generating an activation from the configuration information and sending the activation to a policy distribution point. The policy distribution point converts the activation into device-specific instructions that provision the network element to start the service for the subscriber.

In another embodiment, a system by which networked-based services are self-activated includes a billing system, a network element used to provide a service, a core server and two policy distribution points (PDPs). The network element can be a networking device or a computing device. The core server includes a user database, a first part, and a second part.

The first part generates a first activation, and the second part generates a second activation. The first PDP receives the first activation, translates the first activation into first device-specific instructions, sends the first device-specific instructions to the billing system, which is configured to provide the first service to the subscriber. The second PDP receives the second activation, translates the second activation into second device-specific instructions, sends the second device-specific instructions to the network element, which is configured to provide the first service to the subscriber. The first part sends the first activation during the registration steps, and the second part sends the second activation during the subsequent initiation steps.

Other embodiments are also disclosed in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a screenshot provided by the system for the service provider to define more details of start actions indicated in FIG. 5.

FIG. 7 is a screenshot provided by the system for the service provider to define stop actions of the initiation steps.

DETAILED DESCRIPTION

Reference will now be made in detail to some embodiments of the invention, examples of which are illustrated in the accompanying drawings.

Figure 1:
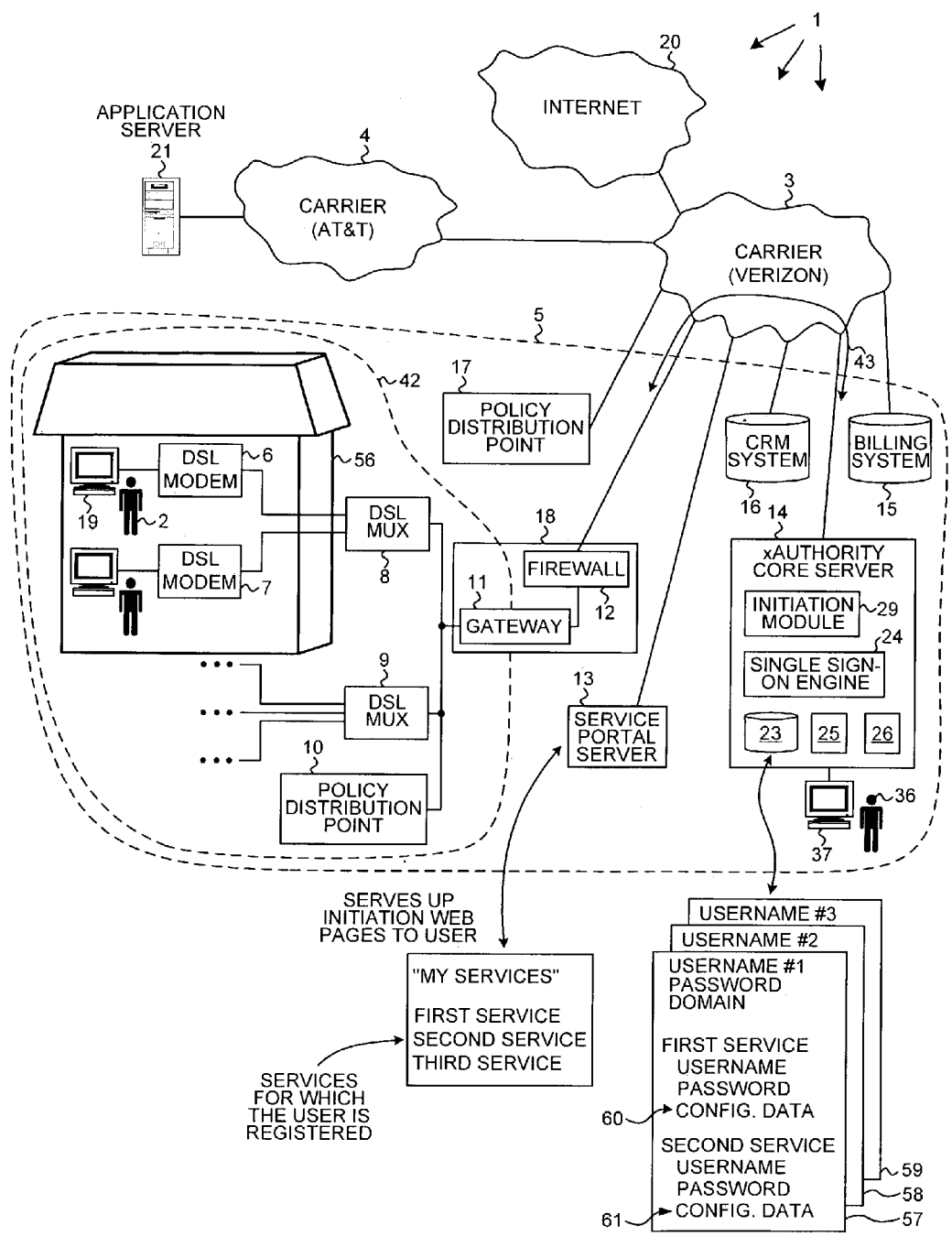
FIG. 1 is a diagram of a system that allows a subscriber to self-activate network-based services.

FIG. 1 is a diagram of a system 1 in accordance with some embodiments of the present invention. A system is provided that allows subscriber 2 quickly to self-activate network-based services provided by a service provider through the networks of carriers 3 and 4. In the example of FIG. 1, the service provider provides equipment and connectivity within dashed boundary 5. This equipment includes DSL modems 6 and 7, DSL access multiplexers 8 and 9, a policy distribution point (PDP) 10, a gateway 11, a firewall 12, a service portal server 13, an xAuthority core server 14, a customer relationship management (CRM) system 15, a billing system 16 and a PDP 17. Gateway 11 is a networking device and can-be an edge router. Firewall 12 can also be a router. Gateway 11 and firewall 12 are together part of an IP services switch 18.

In the example of FIG. 1, two network-based services are made available to subscriber 2 on his computer 19. The first of these services is offering different levels of access to Internet 20 through the network of first carrier 3, i.e., offering different quality of service (QoS) levels. First carrier 3 offers different QoS levels, wherein each level provides a different maximum available bandwidth to subscriber 2. For example, subscriber 2 can pay more to obtain "Gold Access" having greater bandwidth and a higher QoS level than, for example, "Silver Access."

The second network-based service made available to subscriber 2 is use of a hosted application executing on application server 21, a computing device. The application is hosted by the service provider, and access to the application on application server 21 is provided through the network of second carrier 4 (for example, AT&T), as well as through the network of first carrier 3. The application may, for example, be the Microsoft Exchange program that provides email and calendaring functions for individual or office use.

Figure 2:
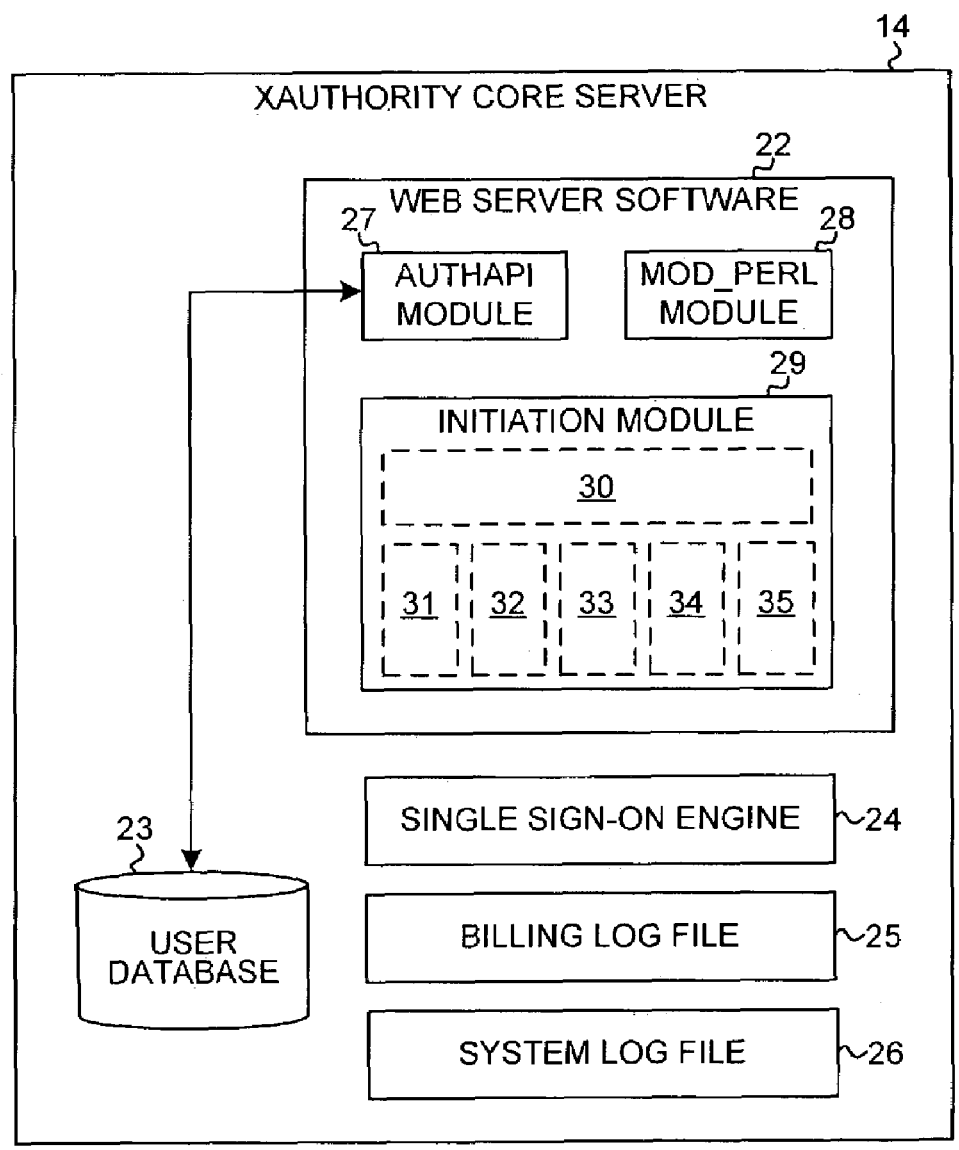
FIG. 2 is a block diagram showing a core server of FIG. 1 in more detail.

FIG. 2 shows the xAuthority core server 14 of FIG. 1 in more detail. xAuthority core server 14 includes web server software 22, user database 23, single sign-on engine 24, billing log file 25 and system log file 26. Web server software 22 in turn includes an AUTHAPI module 27, a MOD_PERL module 28 and an initiation module 29. The application offered in the second service is launched using single sign-on engine 24.

In the present example, web server software 22 is a software web server program called the Apache HTTP Server Project, available from the Apache Software Foundation. Initiation module 29 is a module of web server software 22, as opposed to an external program that is stored in a separate memory. Initiation module 29 is compiled together with the other modules of web server software 22. Initiation module 29 is written in C and C++ as a plurality of components using the methodology set forth in the book entitled "Writing Apache Modules With Perl And C," by Lincoln Stein and Doug MacEachern, March 1999, which is hereby incorporated by reference. In this example, the plurality of components comprising initiation module 29 includes: an interface component 30 that interfaces with the remainder of the Apache web server software, a presentation component 31, an authentication component 32, an authorization component 33, a service listing component 34, and an initiation component 35.

Figure 3A:
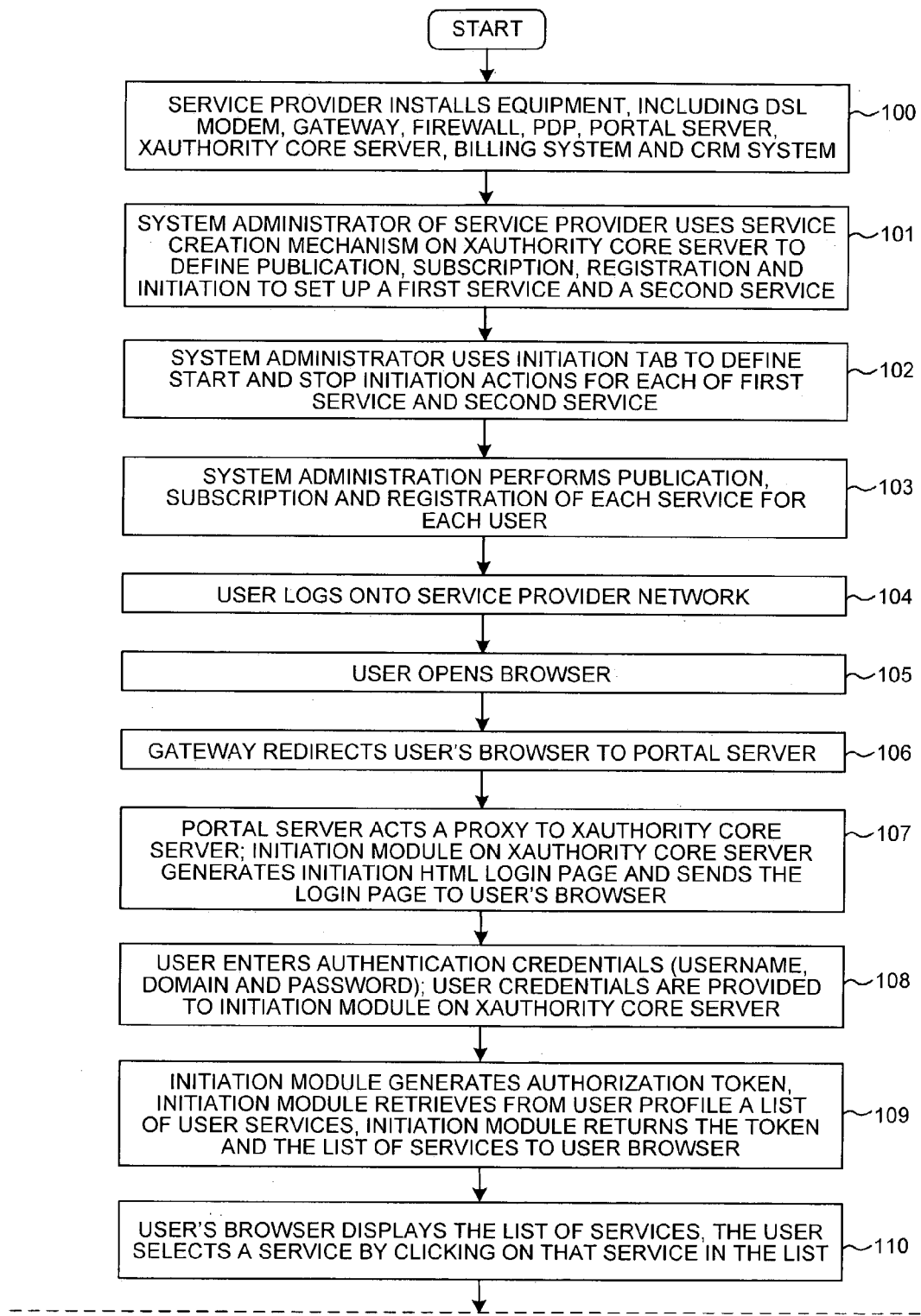
FIGS. 3A and 3B are a flowchart illustrating a method of initiating a network-based service in accordance with a specific embodiment of the present invention.
Figure 3B:
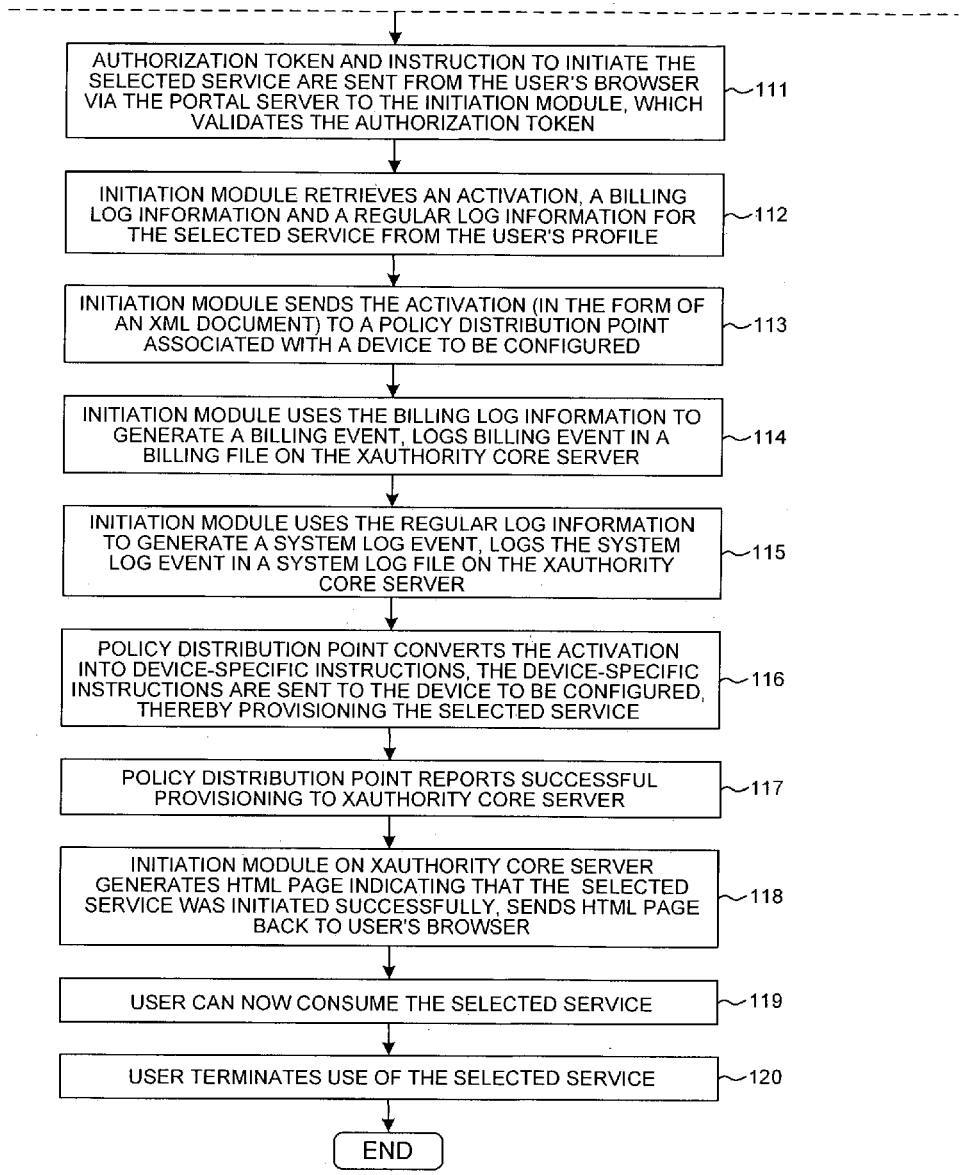

FIGS. 3A and 3B are a flowchart illustrating a method of quickly initiating a network-based service in accordance with a first embodiment of the present invention. Initially (step 100), the service provider installs the equipment and connectivity used to provide a service. In order to provide the first service "Gold Access," for example, the service provider installs the following network elements within boundary 5: DSL modem 6, DSL access multiplexer 8, PDP 10, gateway 11, firewall 12, service portal server 13, xAuthority core server 14, billing system 15 and CRM system 16.

Next (step 101), a system administrator 36 of the service provider uses a display 37 (as shown in FIG. 1) connected to xAuthority core server 14 to access a service creation mechanism executing on xAuthority core server 14. The service creation mechanism includes a state machine. The service creation mechanism allows system administrator 36 to preconfigure publication steps, subscription steps, registration steps and initiation steps in order to set up the first service (Gold QoS Internet access) and the second service (Microsoft Exchange application). The steps correspond to states of the state machine. For additional information on the service creation mechanism, see patent application Ser. No. 10/213,043, entitled "System And Method For Setting Up User Self-Activating Network-Based Services", by Bellinger et al., filed Aug. 5, 2002, now U.S. Pat. No. 7,024,470 (the subject matter of which is incorporated herein by reference).

Figure 4:
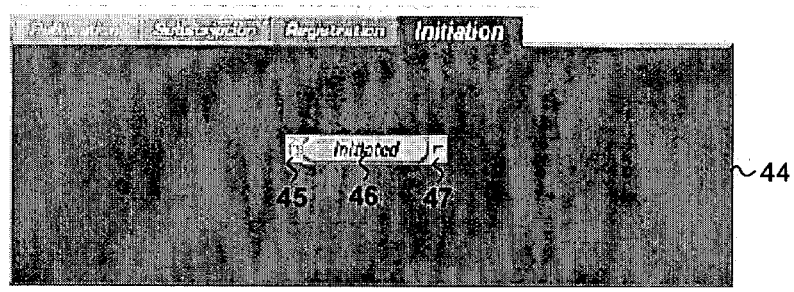
FIG. 4 is a screenshot of an initiation tab of the system used by a service provider to preconfigure initiation steps.

Next (step 102), system administrator 36 selects an initiation tab of the service creation mechanism that relates to initiations steps. FIG. 4 shows a screenshot of an initiation tab 44 that system administrator 36 sees on display 37. When system administrator 36 clicks on initiation tab 44, a state table for defining initiation steps is presented. The arrow symbol 45 on the left of the "Initiated" icon 46 represents actions (start actions) to be performed at the beginning of initiation of the first service and the second service. The square symbol 47 on the right of the "Initiated" icon 46 represents actions (stop actions) to be performed when the subscriber terminates the initiation. To define the start actions, system administrator 36 clicks on symbol 45.

Figure 5:
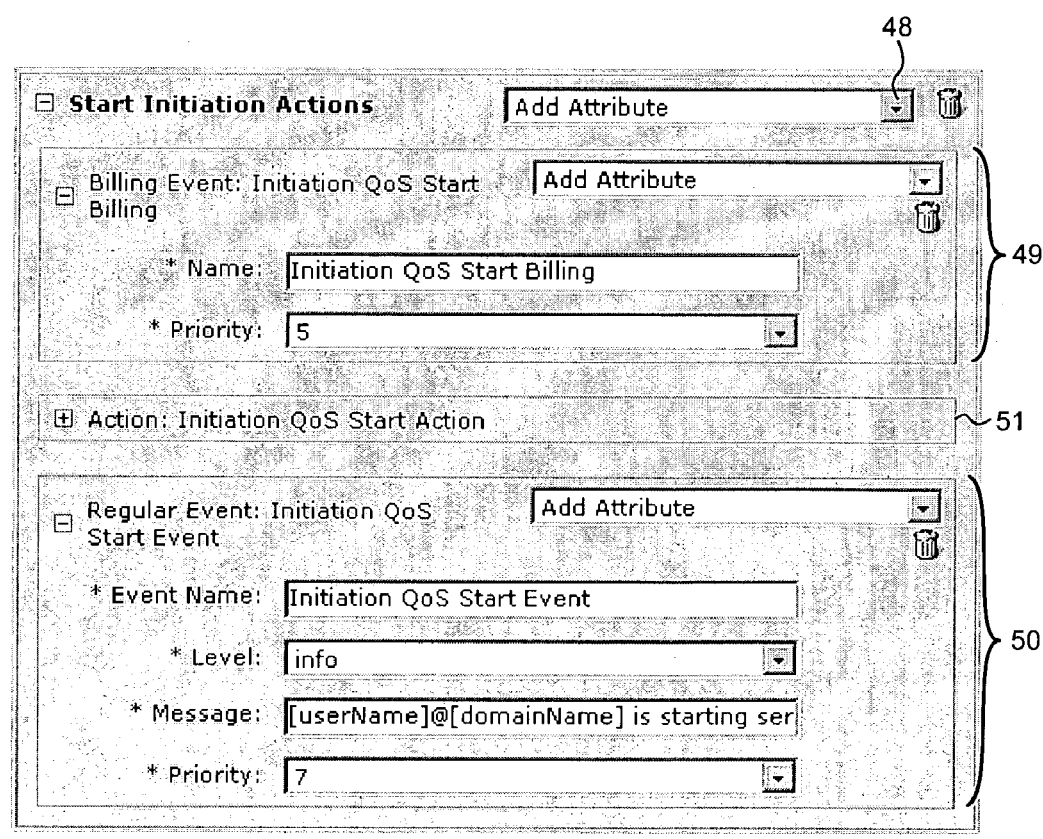
FIG. 5 is a screenshot provided by the system for the service provider to define start actions of the initiation steps.

FIG. 5 shows a screenshot that the service creation mechanism presents to system administrator 36 when system administrator 36 clicks on symbol 45. System administrator 36 uses the drop menu 48 to identify the type of information to be added, such as billing log information (relating to billing events), system log information (relating to regular events), and information relating to activations.

Portion 49 of the screen is used to define a message that is written into billing log file 25 (as shown in FIG. 2) when subscriber 2 starts the initiation of the first service. Billing log file 25 is maintained on xAuthority core server 14. In this example, an XML document describing the billing event is written into billing log file 25. The priority "5" indicates the priority with respect to other start initiation actions.

Portion 50 of the screen is used to define system log information that is written into a system log file when subscriber 2 starts the initiation of the first service. System log file 26 is maintained on xAuthority core server 14, as shown in FIG. 2. In this example, the parameters in the message string "[userName]@[domainName] is starting service from ?ipAddress?" are filled in, and the string is logged in the system log file 26. System administrator 36 can use this system log file 26 to determine that the first service has been initiated.

Figures 6, 7:
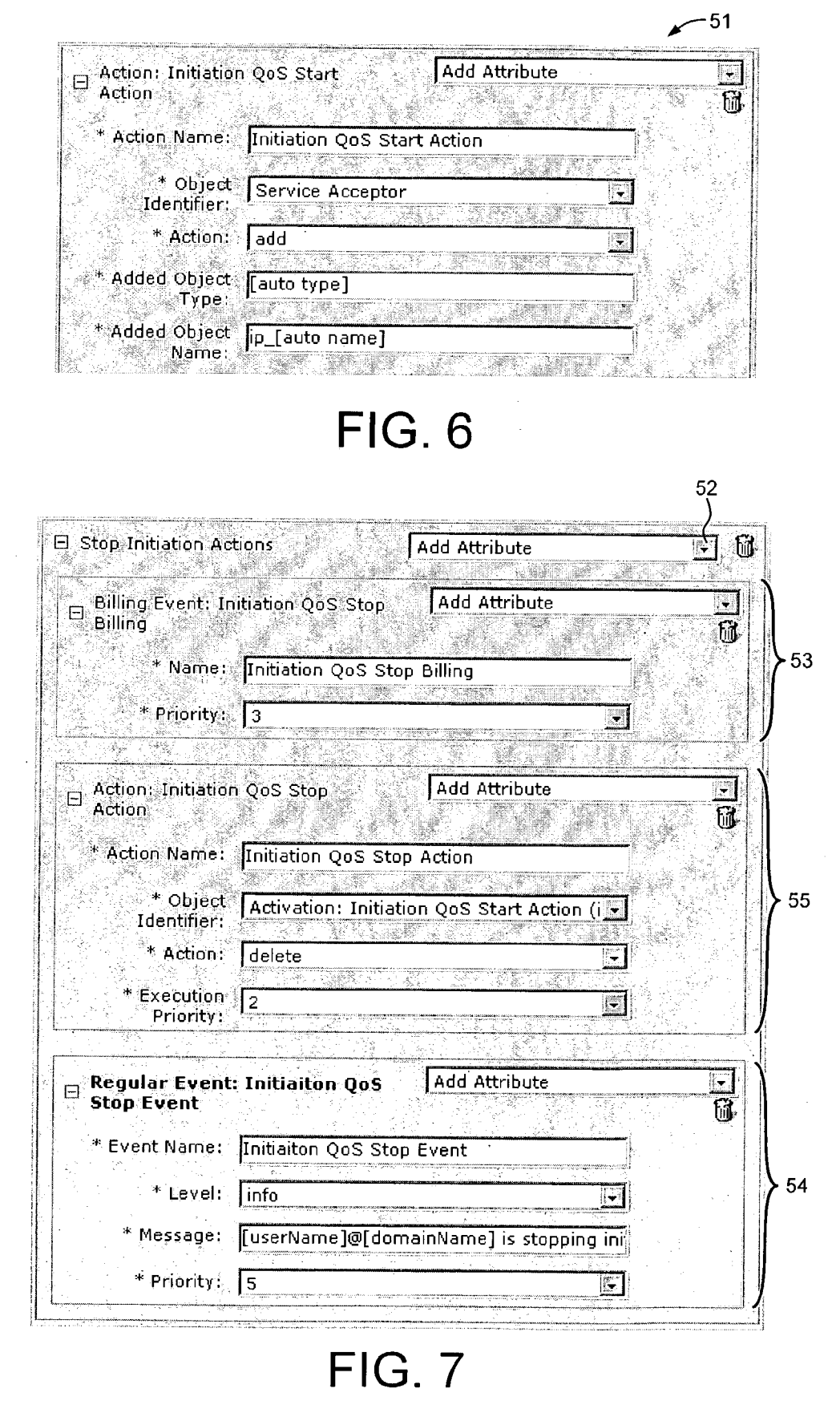

Portion 51 of the screen is used to define an activation that will be sent to PDP 10 when subscriber 2 initiates the first service. FIG. 6 is a more detailed diagram of portion 51. Portion 51 is labeled "Action". In this example, the action performed by the activation is to configure gateway 11 with a network cross-connection to enable the first service. The network cross-connection is a TCP/IP connection between the computer 19 of subscriber 2 and an Internet access point on network 3. An add instruction is being defined using portion 51. The add instruction is to "add" an object of the type "[auto type]" with the name "ip_[auto name]" to "Service Acceptor". The service acceptor in this case has been previously defined to be gateway 11. This add instruction, once defined, will be sent in the form of an activation to PDP 10 when subscriber 2 starts initiation of the first service. The PDP 10 will then convert the activation into device-specific instructions that are understood by gateway 11. For a more detailed treatment of PDPs and how they configure network elements that are used to provide network-based services, see U.S. patent application Ser. No. 10/223,846 entitled "Policy Distribution Point For Setting Up Network-Based Services," by Bellinger et al., filed Aug. 19, 2002, now U.S. Pat. No. 7,134,013, which is incorporated herein by reference.

Gateway 11 may alternatively be configured by PDP 17, which lies outside LAN 42 (as shown in FIG. 1). PDP 17 can be used to configure devices on LAN 42 where activations cannot be sent through firewall 12 to reach PDP 10. In the network configuration shown in FIG. 1, activations can travel through a secure network path 43 from xAuthority core server 14 to PDP 10.

FIG. 7 shows a screen that is presented when system administrator 36 clicks symbol 47 of the initiation tab state table in FIG. 5. System administrator 36 clicks on symbol 47 to define the stop actions. System administrator 36 uses the drop menu 52 to identify the type of information to be added, such as billing log information (relating to billing events), system log information (relating to regular events), and information relating to activations.

Portion 53 of the screen is used to define a message that is written into billing log file 25 when subscriber 2 terminates use of the first service. An XML document describing the billing event is written into billing log file 25. The priority "3" indicates the priority with respect to other stop initiation actions.

Portion 54 of the screen is used to define regular log information that is written into the system log file 26 when subscriber 2 terminates his use of the first service. The parameters in message string "[userName]@[domainName] is stopping service from ?ipAddress?" are filled in, and the string is logged in the system log file 26. System administrator 36 can use this system log file 26 to determine that use of the first service has been terminated.

Portion 55 of the screen is used to define an activation that will be sent to PDP 10 when subscriber 2 terminates use of the first service. The action performed by the activation is to configure gateway 11 to disconnect the network cross-connection that had enabled the first service. In FIG. 7, a delete instruction is being defined using portion 55. The delete instruction causes PDP 10 to delete the changes made by the previously-defined start activations. This delete instruction, once defined, will be sent in the form of an activation to PDP 10 when subscriber 2 terminates use of the first service. PDP 10 will then convert the delete instruction into device-specific instructions that are understood by gateway 11. The device specific instructions cause gateway 11 to terminate the TCP/IP connection between computer 19 and the Internet access point on network 3.

Next (step 103 in FIG. 3A), system administrator 36 performs the publication, subscription and registration of the first service to subscriber 2. Once this is complete, subscriber 2 is able to initiate, use and terminate use of the first service. In a similar fashion, system administrator 36 defines the initiation start and stop steps, publishes the second service, subscribes subscriber 2 to the second service and registers the second service for subscriber 2. No more action is required by system administrator 36.

Next (step 104), subscriber 2 logs onto the service provider's network. Subscriber 2 uses computer 19 to initialize DSL modem 6 such that DSL modem 6 can communicate with the service provider's network, including gateway 11. A username and password is then passed through DSL modem 6, through DSL access multiplexers 8 to gateway 11. An authentication mechanism within IP services switch 18 uses this information to authenticate subscriber 2. Login to the network is then complete.

Next (step 105), subscriber 2 opens a browser executing on computer 19. The browser requests by default a web page. This HTTP request is redirected (step 106) by gateway 11 to service portal server 13.

Next (step 107), service portal server 13 acts as a proxy to xAuthority core server 14. Service portal 13 is a subscriber-facing HTML interface driven by a J2EE web container. The HTTP request is received onto interface component 30 of initiation module 29 on xAuthority core server 14. Interface component 30 handles HTTP requests for specified URLs on xAuthority core server 14 and forwards the requests to other components of initiation module 29. Authorization component 33 of initiation module 29 examines the HTTP request looking for an authorization token. Because no valid authorization token is found, initiation module 29 generates an HTML login page. xAuthority core server 14 sends the HTML login page through service portal server 13, through gateway 11, and back to the subscriber's browser executing on computer 19. The login page is displayed to subscriber 2 prompting the subscriber for username, password, and domain name.

Next (step 108), subscriber 2 enters his username, password and domain name. In the present example, a set of subscribers is situated within building 56. This set of subscribers has its own domain name. This domain name is used to distinguish subscribers within building 56 from other subscribers within the service provider's entire network. The username, password and domain name of subscriber 2 are sent by the browser to service portal server 13. Service portal server 13 in turn forwards the subscriber credentials to xAuthority core server 14. Initiation module 29 receives the credentials.

Next (step 109), initiation module 29 consults user database 23 containing a plurality of user objects 57, 58 and 59. Initiation module 29 compares the credentials (username, password, domain name) received with credentials stored in the object 57 of subscriber 2. For subscriber 2, the username stored in object 57 is "username#1," the password stored is "password," and the domain name stored is "domain." In the present example, the credentials received match the credentials stored in object 57. This indicates that object 57 is the object for subscriber 2.

Due to the match, authentication component 32 of initiation module 29 generates an authorization token, and service listing component 34 retrieves a list of registered services from object 57. In the example, there are two services listed in object 57, the first service and the second service. Configuration data 60 for the first service includes configuration data to provision gateway 11 to provide the QoS Internet access (Gold Access) via the network of first carrier 3. Configuration data 61 for the second service includes configuration data to provision gateway 11 to provide access to the application on application server 21 through the network of second carrier 4, as well as through the network of first carrier 3. Initiation module 29 returns the authorization token in the form of an HTTP cookie and a list of registered services as an HTML document via service portal server 13 and gateway 11 to the browser executing on computer 19.

The registered services are displayed on the subscriber's computer 19. The authorization token in the form of an HTTP cookie is valid only for one log-on session. The authorization token is discarded when the browser is closed.

Next (step 110), subscriber 2 selects a service to initiate by clicking on the displayed service. In this example, subscriber 2 selects the first service. The browser on computer 47 then sends (step 111) the authorization token in the form of an HTTP cookie and the name of the service being initiated ("first service") in HTML via the service portal server 13 to initiation module 29. Authorization component 33 of initiation module 29 validates the authorization token. In another example, where authorization component 33 cannot validate the authorization token, subscriber 2 is returned to step 108 and asked to re-authenticate.

Next (step 112), initiation module 29 retrieves the configuration data 60 for the first service from object 57. The configuration data 60 includes the activation, the billing log information and the system log information previously defined by system administrator 36 for the first service.

Next (step 113), initiation component 35 of initiation module 29 sends the activation in the form of an XML document to the particular policy distribution point associated with the device to be configured. In this example, the device to be configured is gateway 11, and the activation is sent to PDP 10.

Next (step 114), initiation module 29 uses the billing log information to log a billing event into billing log file 25 on the xAuthority core server 14.

Next (step 115), initiation module 29 uses the system log information to log a system log event into the system log file 26 on the xAuthority core server 14.

Next (step 116), PDP 10 converts the activation into device-specific instructions. The device-specific instructions are sent to the device to be configured (in this case, gateway 11).

In the case of the first service (QoS access to Internet 20 ("Gold Access") via the network of first carrier 3), gateway 11 completes a network cross-connection for subscriber 2. This network cross-connection is a TCP/IP connection between computer 19 and an Internet access point on the network of first carrier 3. Before the configuration of gateway 11, gateway 11 prevents subscriber 2 from having access to the network of first carrier 3 because the necessary network cross-connection has not been completed. (Subscriber 2 also does not have access to application server 21 for the second service before the network cross-connection has been completed.)

Next (step 117), PDP 10 reports successful provisioning by generating an XML response that is sent to initiation module 29 on xAuthority core server 14.

Next (step 118), initiation module 29 receives the response from PDP 10 and in turn generates an HTML page indicating that the selected service was successfully initiated.

Figure 8:
FIG. 8 is a screenshot provided by the system to a subscriber confirming that a service has been started.

FIG. 8 is a screenshot showing an HTML page 62 that subscriber 2 will see after the first service has been initiated. HTML page 62 is sent via service portal server 13 and gateway 11 to the subscriber's browser on computer 19. The first service is now available for use for subscriber 2. In step 119, subscriber 2 consumes the selected service, in this example, Gold Access to the Internet 20.

Figure 9:
FIG. 9 is a screenshot provided by the system to the subscriber showing the services that are available to the subscriber and providing links to start and stop those services.

FIG. 9 is a screenshot of an HTML page 63, the "my services" page, that is presented to subscriber 2 as he is consuming services. HTML page 63 shows that two services have been registered for subscriber 2: "Gold Access" and "Silver Access". Subscriber 2 also has access to a directory of users under the "Directory" link. Subscriber 2 can initiate the services that have already been registered in the registration steps. In this example, "initiate" can encompass instantiating single sign-on engine 24, as well as starting and stopping services, which involves sending activations to configure network elements, such as networking devices and computing devices. Initiation component 35 of initiation module 29 both sends activations and instantiates single sign-on engine 24.

HTML page 63 in FIG. 9 also shows the two services ("Gold Access" and "Silver Access") that subscriber 2 is potentially consuming, as well as "[stop]" links next to the name of each service. When subscriber 2 no longer wishes to consume the first service ("Gold Access"), subscriber 2 clicks on the stop link next to the service name. Subscriber 2 thereby uses the initiation module 29 to select the service to be terminated. When subscriber 2 clicks on the stop link, a message is sent from the browser of subscriber 2, through service portal server 13, to initiation module 29. Initiation module 29 retrieves the configuration data in the object of subscriber 2 and obtains billing log information, system log information and activations. Initiation module 29 generates a billing event that is logged to billing log file 25, a system log event that is logged to system log file 26, and an activation that is sent to PDP 10. The activation is converted by PDP 10 into device-specific instructions, which cause gateway 11 to disconnect the network cross-connection, thereby disabling the first service for subscriber 2.

Figure 10:
FIG. 10 is a screenshot provided by the system to the subscriber confirming that a service has been stopped.

FIG. 10 is a screenshot showing an HTML page 64 that is sent to subscriber 2 confirming that the first service has been terminated. HTML page 64 is sent to subscriber 2 after PDP 10 replies to initiation module 29 confirming successful termination of the first service.

After the first service has been configured by system administrator 36, the entire process of initiating the first service and terminating the first service occurs automatically without any person other than subscriber 2 performing any action. Moreover, the only action performed by subscriber 2 to launch the first service is to supply his/her credentials and to click on the desired service. The only action performed by subscriber 2 to terminate the first service is to click on a stop link beside the service to be terminated on the "my services" page. Individual subscribers can therefore launch services and terminate services without additional input from any third party.

Figure 11:
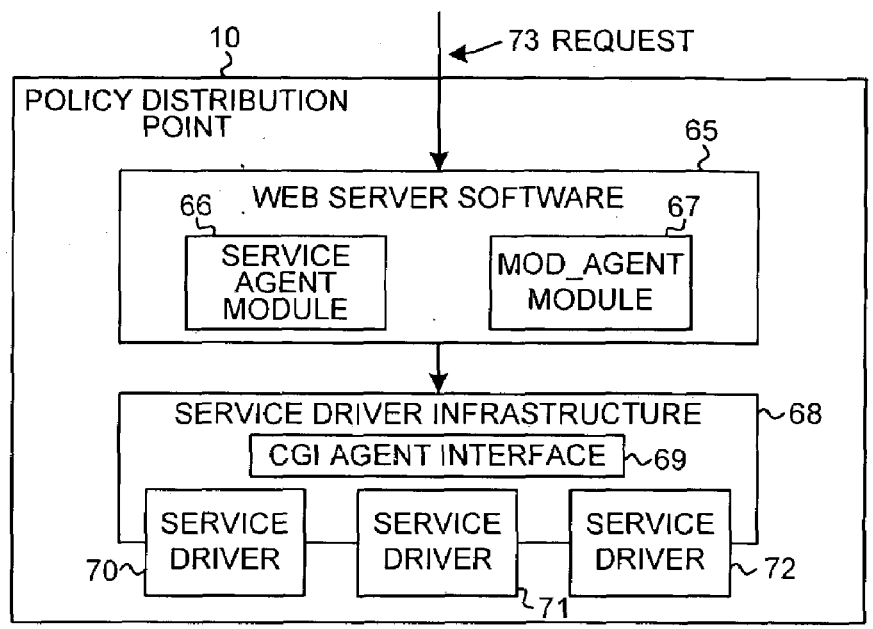
FIG. 11 is a simplified block diagram of one embodiment of a policy distribution point.

FIG. 11 is a simplified diagram of a first embodiment of PDP 10. PDP 10 includes web server software 65 and a service driver infrastructure 68. Web server software 65 has not only the typical SERVICE AGENT module 66, but it also has the MOD_AGENT module 67 that allows PDP 10 to receive request 73 from xAuthority core server 14 at a fast rate.

Web server software 65 interacts with service driver infrastructure 68 through a standard CGI agent interface 69. Customized individual service drivers 70-72 are plugged into the service driver infrastructure 68. For additional information on policy distribution point architecture, see patent application Ser. No. 10/223,846, entitled "Policy Distribution Point For Setting Up Network-Based Services", by Bellinger et al., filed Aug. 19, 2002, now U.S. Pat. No. 7,134,013.

In operation, an activation is received by PDP 10 on web server software 65 as an XML document within an HTTP request 73. Web server software 65 in turn forwards the request to CGI agent interface 69 of service driver infrastructure 68. The appropriate service driver is invoked such that the associated networking element is configured. Web server software 65 and CGI agent interface 69 are separate programs executing in two different memory spaces. The web server software 65 passes the information of HTTP request 73 to the service driver infrastructure 68. This movement of information takes time.

Figure 12:
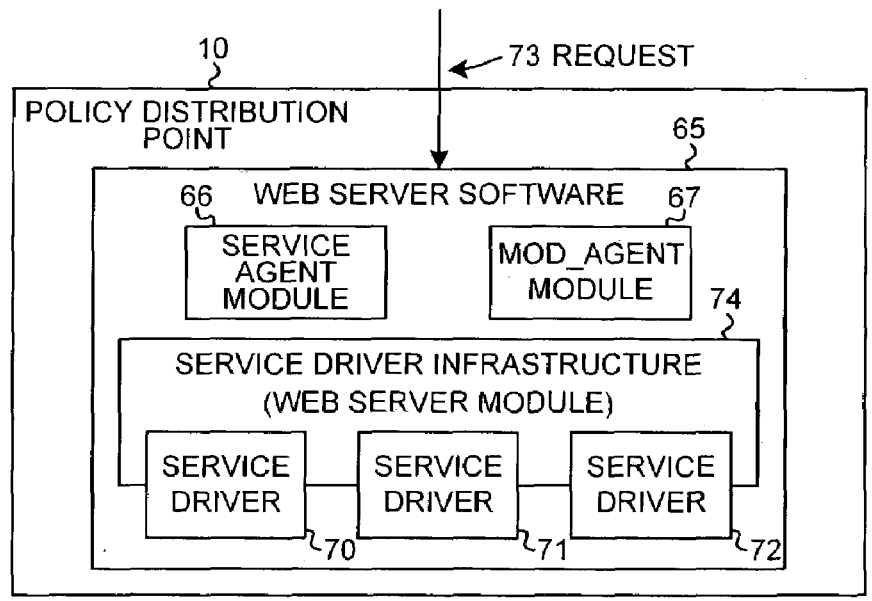
FIG. 12 is a simplified block diagram of another embodiment of a policy distribution point.

FIG. 12 is a simplified diagram of a second embodiment of PDP 10. In the second embodiment, processing of the information in the activation is accelerated by incorporating the service driver infrastructure functionality into web server software 65. This is accomplished by writing the service driver infrastructure as a web server module 74 that is compiled into the web server program. Web server module 74 is not a separate program from web server software 65. It shares the same memory space as web server software 65. Because it shares the same memory space, information in the activation does not need to be transferred from one memory space to another. Web server module 74 simply accesses the web server's memory space to use the information in the activation that came in HTTP request 73.

In the second embodiment, web server software 65 is a software web server program called the Apache HTTP Server Project, available from the Apache Software Foundation. Web server module 74 is written in C and C++ using the methodology set forth in the book entitled "Writing Apache Modules With Perl And C," by Lincoln Stein and Doug MacEachern, March 1999.

In a second embodiment of the present invention, the second service is initiated using steps similar to those shown in FIGS. 3A and 3B. In the second embodiment, for example, the service provider initially installs the connectivity and equipment, including application server 21, used to provide the second service, access to the Microsoft Exchange program.

The embodiments of the present invention increase the speed of self-activation of network-based services in three ways: generating activations faster in xAuthority core server 14, translating activations into device-specific instructions faster in PDP 10, and separating the complex registration steps from the provisioning of network elements, thereby allowing the provisioning to be performed faster. Faster self-activation, in turn, allows subscriber 2 to turn services on and off faster.

Initiation module 29 reduces the delay experienced by subscriber 2 in self-activating the first service by allowing activations to be generated faster in xAuthority core server 14. Because initiation module 29 is a module of web server software 22 and is compiled together with the other modules of web server software 22, initiation module 29 generates an activation for PDP 10 faster than if initiation module 29 were an external program stored in a separate memory.

PDP 10 reduces the delay experienced by subscriber 2 in self-activating the first service by translating the activation it receives from initiation module 29 faster from XML into device-specific instructions for gateway 11. Because service driver infrastructure 74 is a module of web server software 65 and is compiled together with the other modules of web server software 65, PDP 10 translates the activation received from initiation module 29 faster from XML into device-specific instructions for gateway 11 than if service driver infrastructure 74 were a program external to web server software 65 and were stored in a separate memory.

The embodiments described above allow subscriber 2 to initiate and terminate network-based services more quickly than with service creation mechanisms that run through predefined publication steps, subscription steps, registration steps and initiation steps all at the same time. A service creation mechanism that employs initiation module 29 allows the initiation steps to be decoupled from the other steps and thereby to be performed faster. The registration steps need not be performed each time subscriber 2 starts and stops a service, for example, when subscriber 2 switches back and forth between Gold Access and Silver Access to Internet 20. Subscriber 2 might choose, for example, to surf the Internet 20 using Silver Access, but might want periodically to download videos, music or pictures using Gold Access.

The service provider might permit subscribe 2 to perform the registration steps of authentication and authorization only once per log-on session. This is accomplished in another embodiment by writing the authorization component 33 as a shared library in C++ so that it can optionally be replaced by another shared library in order to change the authorization behavior of the entire initiation module 29. For example, the service provider wishes to use the fact that subscriber 2 is already connected and authenticated in LAN 42. Due to this fact, the service provider wishes to allow subscriber 2 to initiate the first service without authenticating against initiation module 29 as set forth above. The service provider can do this by replacing authorization component 33 (now written as a shared library) with a custom version of the library. Such a custom version can be immediately executed on the xAuthority core server 14 without recompiling initiation module 29 simply by restarting the web server software 22 of the xAuthority core server 14.

Thus, service initiation can be made faster in part by permitting subscriber 2 to input registration information only once per log-on session and not each time initiation steps are performed. Registration steps, however, involve more than subscriber 2 inputting registration information. During the registration steps, registration information is also stored and validated, and database objects, billing objects and CRM objects are generated. There are two types of databases that are accessed during the registration steps: relational databases, such as billing system 15 and CRM system 16, which can employ Oracle databases, and LDAP directory databases, such as user database 23, which can employ an iPlanet directory. Many reads and writes are performed on the user database 23, the billing system 15 and the CRM system 16 during the registration steps. Writing to and manipulating these databases can be time consuming. Interaction with these databases is therefore made a part of the registration steps. By decoupling the initiation steps from the registration steps, initiation module 29 can initiate services faster because it performs only database reads.

The initiation steps are limited to provisioning network elements and thereby turning on and off networked-based services. Because the time consuming steps of manipulating the databases has already been performed before the initiation steps are undertaken, subscriber 2 experiences smaller delays when turning on and off a service.

For example, subscriber 2 can consume the first service shortly after the initiation module 29 sends an activation to PDP 10. Subscriber 2 does not have to wait until database objects, billing objects and CRM objects are generated and written to user database 23, billing system 15, and CRM system 16; the required objects have already been generated and written to databases and external systems in the registration steps. The activation that is sent to PDP 10 was substantially completed during the registration steps. Only timely unique identifiers, such as the IP address of subscriber 2, are added to the activation during the initiation steps. This permits the first service to be provisioned for the real-time location of subscriber 2, for the event that subscriber 2 uses a computer other than computer 19.

Although initiation module 29 does not create billing objects, it does generate billing events that it logs in billing log file 25. The logging of billing events in billing log file 25 within xAuthority core server 14 is, however, much faster than writing billing objects to an external billing system.

Although the speed of initiating services in the embodiments described above is increased by making initiation module 29 a module of web server software 22, the speed can also be increased by incorporating other software as modules of web server software 22. For example, in another embodiment, single sign-on engine 24 is a module of web server software 22, as opposed to an external program stored in a separate memory. Subscriber 2 is automatically signed on to use the email and calendaring functions of Microsoft Exchange faster because single sign-on engine 24 can generate the required HTTP sign-on packet more quickly. The faster automatic sign-on is in addition to the faster configuration of application server 21 to provide the second service.

Although in some embodiments, interaction with the user database 23, the billing system 15 and the CRM system 16 is made a part of the registration steps so that initiation module 29 can initiate services faster without database writes, in other embodiments a minimal number of database writes (for example, one) are performed during the initiation steps. The speed of initiating services in the other embodiments is somewhat slower.

Compact Disc Appendix

The Compact Disc contains: the directory file AMP, 1.07 MB, written to disc Mar. 4, 2003; the directory file INITIATION, 300 KB, written to disc Mar. 4, 2003; the directory file PORTAL, 1.35 MB, written to disc Mar. 4, 2003; the directory file XLINK, 1.69 MB, written to disc Mar. 4, 2003; and the file CD Appendix Title Page.txt, 304 bytes, written to disc Mar. 4, 2003. The AMP and XLINK directories contain xAuthority core server source code written primarily in XML and Perl. The INITIATION directory contains the source code for the initiation module 29. The PORTAL directory contains source code for the service portal server. The PORTAL source code is mostly HTML pages containing Javascript, Perl scripts and Bash script. All the material on the Compact Disc is hereby expressly incorporated by reference into the present application.

Although the present invention has been described in connection with certain specific embodiments for instructional purposes, the present invention is not limited thereto. For example, the first service is Internet access provided at different QoS levels through a gateway, which is a networking device. Other embodiments can start and stop other services, e.g., streaming video, that are also provided using networking devices, such as edge routers or firewall routers from Cisco Systems. The second service is access to email and calendaring applications executing on an email server, which is a computing device. Other embodiments can start and stop other services that are also provided using computing devices, such workstations running the Solaris operating system from Sun Microsystems. Accordingly, various modifications, adaptations, and combinations of various features of the described embodiments can be practiced without departing from the scope of the invention as set forth in the claims.

What is claimed is:

1. A method comprising:
   (a) providing a first interface, wherein a service provider identifies a first network element used to provide a first service to a subscriber, and wherein the service provider defines first configuration information that is sent to the first network element in the event the subscriber elects to start the first service; and
   (b) providing a second interface, wherein the subscriber registers for the first service and initiates the first service without action after (a) by the service provider, wherein the subscriber registers once for the first service and thereafter is able to initiate the first service multiple times, wherein starting the first service involves generating a first activation from the first configuration information and sending the first activation to a policy distribution point such that the policy distribution point converts the first activation into first device-specific instructions that provision the first network element to start the first service for the subscriber.

2. The method of claim 1, wherein step (a) includes writing items of information to a database regarding: whether the subscriber is authorized to use the first service, whether the first network element is used to provide the first service, and the IP address of the first network element.

3. The method of claim 2, wherein the items of information are preconfigured by the service provider using the first interface before the subscriber initiates the first service.

4. The method of claim 2, wherein registration of the first service in (b) involves writing one of the items of information to a database such that the item of information is not written to the database during subsequent initiation of the first service.

5. The method of claim 1, wherein registration of the first service in (b) involves generating an object for a billing system, and wherein no object for the billing system is generated during subsequent initiation of the first service.

6. The method of claim 1, wherein the first configuration information is sent to the policy distribution point as an XML document within an HTTP request.

7. The method of claim 1, wherein the first interface is a graphical user interface between the service provider and a state machine.

8. The method of claim 1, wherein the policy distribution point includes a single program that: (x) receives an HTTP request, the HTTP request containing the first configuration information, (y) converts the first configuration information into the first device-specific instructions, and (z) sends the first device-specific instructions to the first network element.

9. The method of claim 8, wherein a first part of the single program performs (x), a second part of the single program performs (y), and a third part of the single program performs (z), and wherein the first part, the second part and the third part are compiled together.

10. The method of claim 9, wherein the policy distribution point comprises web server software, wherein the web server software comprises the single program, and wherein the second part is a module, the module being compiled as part of the web server software.

11. The method of claim 1, wherein the first configuration information includes instructions taken from the group consisting of: open a port on a firewall, complete a network cross-connection on a gateway, and route an HTTP request from one IP address to another IP address.

12. The method of claim 1, wherein the first network element is taken from the group consisting of: a gateway, a firewall, a DSL modem, an application server, a CRM system and a billing system.

13. The method of claim 1, wherein step (a) further includes identifying a second network element used to provide a second service to the subscriber, and wherein the service provider defines second configuration information that is sent to the second network element in the event the subscriber elects to start the second service; and
   wherein step (b) further includes registering for the second service and initiating the second service without action after (a) by the service provider, wherein the subscriber registers once for the second service and thereafter can initiate the second service multiple times, wherein starting the second service involves generating a second activation from the second configuration information and sending the second activation to the policy distribution point such that the policy distribution point converts the second activation into second device-specific instructions that provision the second network element to start the second service for the subscriber.

14. The method of claim 13, wherein the first network element is a networking device and the second network element is a computing device.

15. The method of claim 1, wherein the service provider defines third configuration information that is sent to the first network element in the event the subscriber elects to stop the first service; and
   wherein the subscriber stops the first service without action after (a) by the service provider, wherein stopping the first service involves sending the third configuration information to the policy distribution point such that the policy distribution point converts the third configuration information into third device-specific instructions that provision the first network element so that the first service is stopped.

16. A computer-readable medium having computer-executable instructions for performing steps comprising:
   (a) providing an interface, wherein a service provider identifies a first network element used to provide a first service to a subscriber, and wherein the service provider defines first configuration information that is sent to the first network element in the event the subscriber elects to initiate the first service; and
   (b) providing an interface, wherein the subscriber starts and stops the first service without action after (a) by the service provider, wherein initiation of the first service involves sending the first configuration information to a policy distribution point such that the policy distribution point converts the first configuration information into first device-specific instructions that provision the first network element to start and to stop the first service for the subscriber.

17. The computer-readable medium of claim 16, wherein the policy distribution point comprises web server software, wherein the web server software comprises a single program that (x) sends and receives HTTP requests, (y) converts instructions contained in the HTTP requests into device-specific instructions, and (z) sends the device-specific instructions to the first network element, wherein a first part of the single program performs (x), a second part of the single program performs (y), and a third part of the single program performs (z), and wherein the first part, the second part and the third part are compiled together.

18. A system comprising:
(a) a first interface on which a network element and configuration information are identified, wherein the network element is used by a service provider to provide a service to a subscriber, and wherein the configuration information is sent to the network element in the event the subscriber elects to start the service; and
(b) a second interface used by the subscriber to register for the service and to initiate the service without action after (a) by the service provider, wherein the subscriber registers once for the service and thereafter is able to initiate the service multiple times, wherein starting the service involves generating a first activation from the configuration information and sending the first activation to a policy distribution point such that the policy distribution point converts the first activation into first device-specific instructions that provision the network element to start the service for the subscriber.

19. The method of claim 18, wherein the configuration information indicates whether the subscriber is authorized to use the service, whether the network element is used to provide the service, and the IP address of the network element.

20. The method of claim 18, wherein the configuration information includes instructions taken from the group consisting of: open a port on a firewall, complete a network cross-connection on a gateway, and route an HTTP request from one IP address to another IP address.

21. The method of claim 18, wherein the subscriber registers for the service by generating an object for a billing system, and wherein no object for the billing system is generated during subsequent initiation of the service.

22. The method of claim 18, wherein the configuration information is sent to the network element as an XML document within an HTTP request.

23. The method of claim 18, wherein the first interface is a graphical user interface between the service provider and a state machine.

24. The method of claim 18, wherein the policy distribution point includes a single program that: (a) receives an HTTP request, the HTTP request containing the configuration information, (b) converts the configuration information into the first device-specific instructions, and (c) sends the first device-specific instructions to the network element.

* * * * *